US010023395B2

(12) United States Patent
Summerell

(10) Patent No.: US 10,023,395 B2
(45) Date of Patent: Jul. 17, 2018

(54) CONVEYOR SUPPORT STRUCTURE AND RETAINER FOR SAME

(71) Applicant: Joy MM Delaware, Inc., Wilmington, DE (US)

(72) Inventor: Paul John Summerell, Gwandalan (AU)

(73) Assignee: Joy Global Underground Mining LLC, Warrendale, PA (US)

( * ) Notice: Subject to any disclaimer, the term of this patent is extended or adjusted under 35 U.S.C. 154(b) by 19 days.

(21) Appl. No.: 15/442,254

(22) Filed: Feb. 24, 2017

(65) Prior Publication Data
US 2017/0247196 A1    Aug. 31, 2017

Related U.S. Application Data

(60) Provisional application No. 62/300,441, filed on Feb. 26, 2016.

(51) Int. Cl.
*B65G 39/12* (2006.01)
*E21F 13/02* (2006.01)

(52) U.S. Cl.
CPC .............. *B65G 39/12* (2013.01); *E21F 13/02* (2013.01)

(58) Field of Classification Search
CPC .......... E21F 13/06; E21C 25/16; E21C 27/02; B65G 39/12; B65G 39/125; B65G 39/14; B65G 39/145; B65G 39/16; B65G 13/11; B65G 13/12
USPC ................................................ 198/824–826
See application file for complete search history.

(56) References Cited

U.S. PATENT DOCUMENTS

| 2,843,432 | A | * | 7/1958 | Kindig | B65G 21/06 |
| | | | | | 198/830 |
| 3,592,001 | A | | 7/1971 | Gross et al. | |
| 3,934,711 | A | * | 1/1976 | Coutant | B65G 39/12 |
| | | | | | 198/830 |
| 3,946,858 | A | * | 3/1976 | Diantonio | B65G 39/12 |
| | | | | | 198/830 |
| 5,667,058 | A | | 9/1997 | Bonnet | |
| 6,302,225 | B1 | * | 10/2001 | Yoshida | B23B 27/18 |
| | | | | | 175/420.2 |
| 6,349,819 | B1 | * | 2/2002 | Nohl | B65G 39/12 |
| | | | | | 198/830 |
| 6,692,000 | B2 | * | 2/2004 | Borne | F16C 33/08 |
| | | | | | 193/35 R |
| 6,799,676 | B1 | * | 10/2004 | Shipmon | B65G 39/12 |
| | | | | | 193/35 R |

(Continued)

OTHER PUBLICATIONS

International Search Report and Written Opinion for Application No. PCT/US2017/019455 dated May 11, 2017 (10 pages).

*Primary Examiner* — Mark A Deuble
(74) *Attorney, Agent, or Firm* — Michael Best & Friedrich LLP

(57) ABSTRACT

A conveyor support includes a frame, a roller, and a retainer. The frame includes a support arm. The roller includes a shaft and a shell supported for rotation relative to the shaft, and the shaft includes an end. The retainer releasably secures the end of the shaft relative to the support arm. The retainer includes a first portion engaging a first side of the support arm and a second portion engaging a second side of the support arm. The second portion is biased toward the first portion to exert a compressive force on the support arm. At least one of the first portion and the second portion engages the shaft of the roller.

20 Claims, 14 Drawing Sheets

(56) References Cited

U.S. PATENT DOCUMENTS

| | | | |
|---|---|---|---|
| 2002/0021920 A1 | 2/2002 | Hayakawa et al. | |
| 2008/0179479 A1* | 7/2008 | Petron | B65G 15/60 |
| | | | 248/309.2 |
| 2009/0250322 A1* | 10/2009 | Jager | B65G 21/06 |
| | | | 198/835 |
| 2011/0176858 A1 | 7/2011 | Lally | |

* cited by examiner

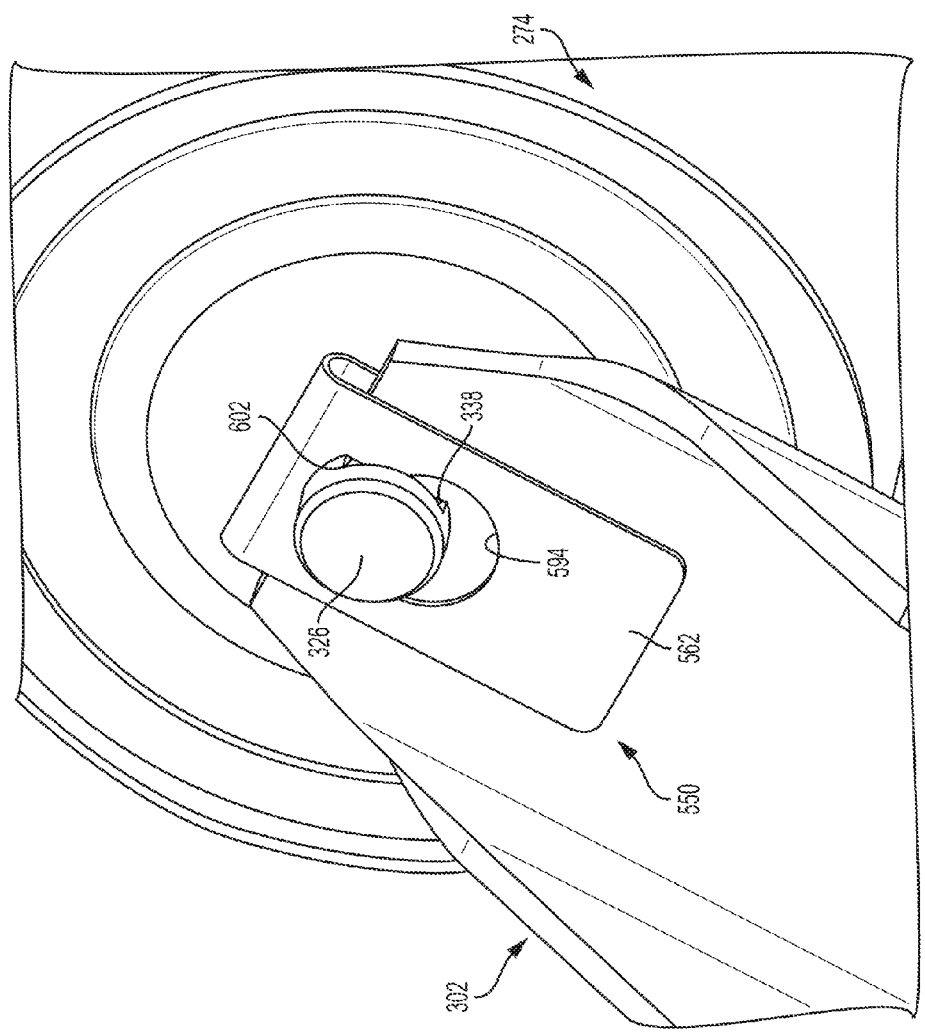

CONVEYOR SUPPORT STRUCTURE AND RETAINER FOR SAME

CROSS-REFERENCE TO RELATED APPLICATION

This application claims the benefit of prior-filed U.S. Provisional Patent Application No. 62/300,441, filed Feb. 26, 2016, the entire contents of which are incorporated by reference.

BACKGROUND

The present disclosure relates to conveyor systems, and particularly to a retaining mechanism for a roller support for a conveyor.

Conveyor systems are used in a variety of applications. For example, mining systems typically include one or more conveyor systems for transporting cut material. The conveyor system includes a conveyor belt and a support structure for supporting the belt. The support structure includes multiple idler rollers, and each idler roller typically includes a shell that is rotatable about a shaft. The shell may rotate about the shaft as the belt contacts and moves over an outer surface of the shell.

SUMMARY

In one aspect, a conveyor support includes a frame, a roller, and a retainer. The frame includes a support arm. The roller includes a shaft and a shell supported for rotation relative to the shaft, and the shaft includes an end. The retainer releasably secures the end of the shaft relative to the support arm. The retainer includes a first portion engaging a first side of the support arm and a second portion engaging a second side of the support arm. The second portion is biased toward the first portion to exert a compressive force on the support arm. At least one of the first portion and the second portion engages the shaft of the roller.

In another aspect, a retainer is provided for releasably securing a conveyor roller to a support frame. The retainer includes a first portion, a second portion, and an intermediate portion. The first portion includes a pair of parallel legs oriented in a first plane, the legs separated by a gap. The second portion includes a planar portion extending in a second plane offset from the first plane. The second portion further includes one of a protrusion and a recess configured to engage the other of a protrusion and a recess formed on the support frame. The second portion is biased toward the first portion, and at least one of the first portion and the second portion is configured to engage a shaft of the roller. The intermediate portion extends between the first portion and the second portion.

In yet another aspect, a method for releasably securing a roller to a conveyor support frame includes positioning a shaft of the roller within a slot of the support frame; aligning a retainer adjacent an end surface of the support frame; and sliding the retainer relative to the support frame until a portion of the retainer extends around a portion of the shaft and is secured against movement relative to the support frame.

Other aspects will become apparent by consideration of the detailed description and accompanying drawings.

BRIEF DESCRIPTION OF THE DRAWINGS

FIG. 15 is a perspective view of the retaining mechanism of FIG. 14, the roller, and the support frame.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

DETAILED DESCRIPTION

Figure 1:
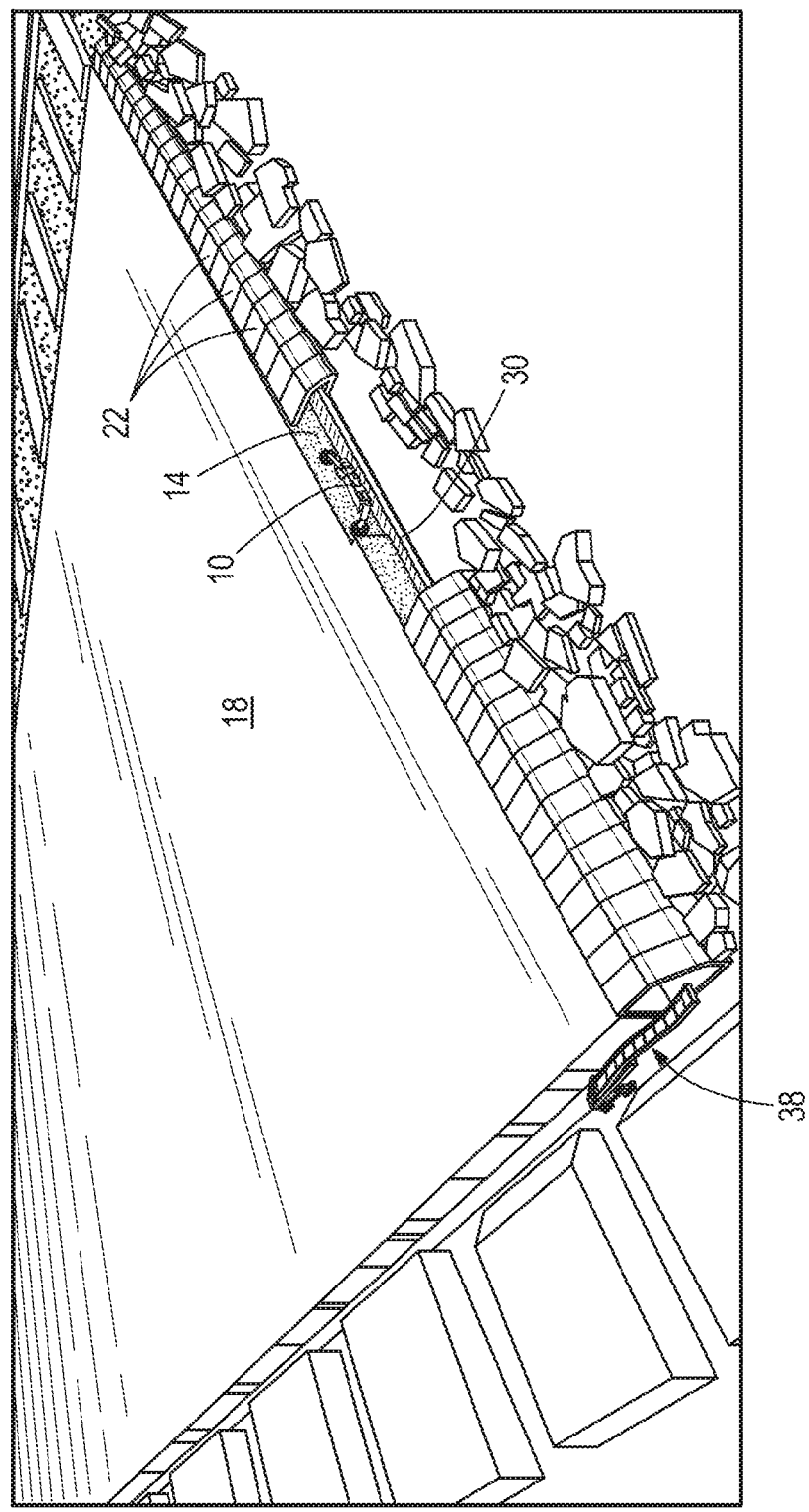
FIG. 1 is a perspective view of a mining operation.
Figure 2:
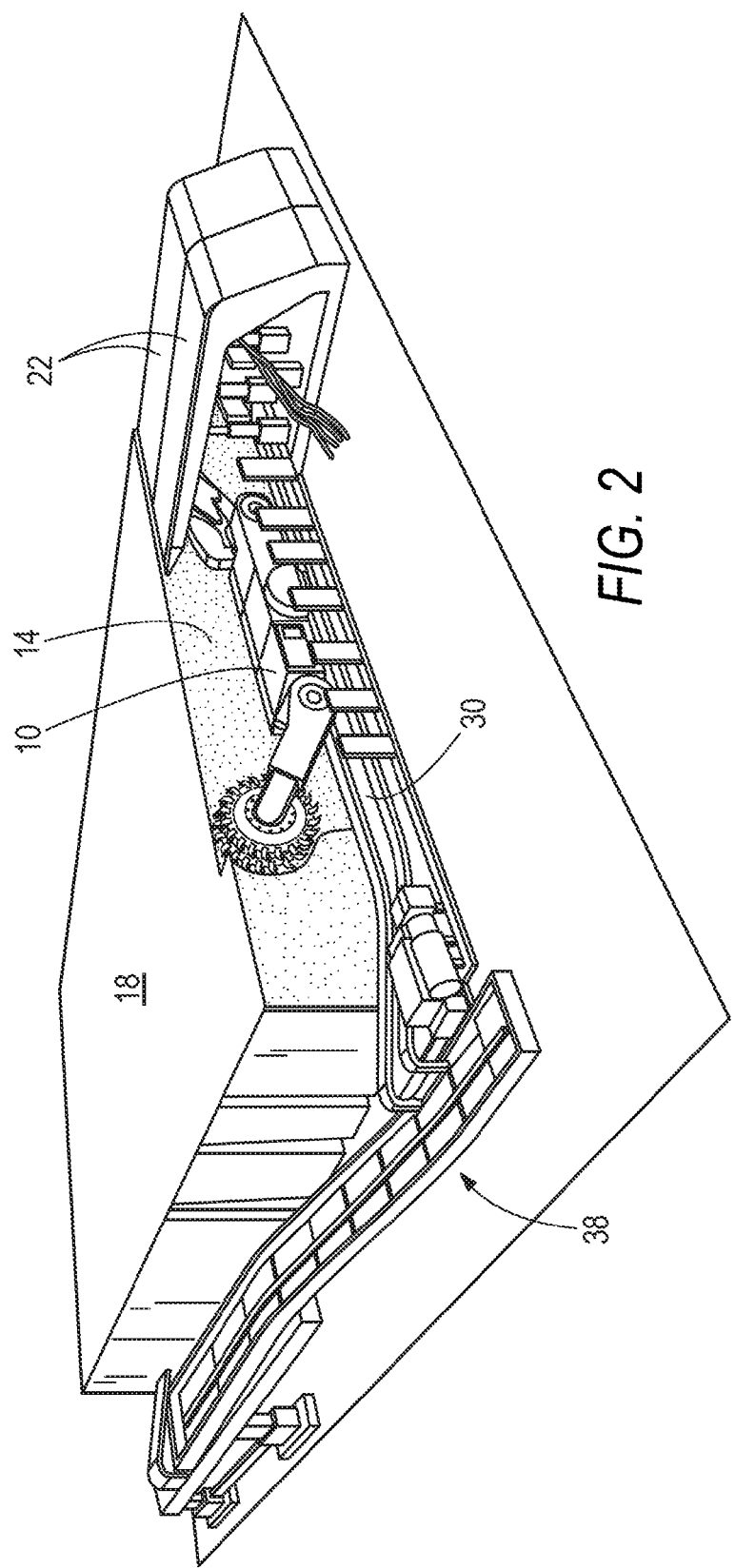
FIG. 2 is an enlarged perspective view of the mining operation of FIG. 1.

Conveyor systems may be used in a variety of applications. For example, FIGS. 1 and 2 illustrate a longwall underground mining operation in which a mining machine excavates material from a mine face 14 of a mineral seam 18 and progresses through the seam 18 as material is removed. In the illustrated embodiment, the mining machine 10 is a conventional longwall shearer, and the structure and operation of the shearer may be readily understood by a person of ordinary skill in the art. In other embodiments, a different type of mining machine may be used. Roof supports 22 are aligned in a row along the length of the mine face 14 to provide protection (a portion of the roof supports 22 are removed in FIGS. 1 and 2 to illustrate the mining machine 10 and the mine face 14). After the shearer 10 removes material from the mine face 14, the material is directed onto a face conveyor 30, which conveys the material generally parallel to the mine face 14. The material is then deposited on a beam stage loader 38, which may be positioned proximate an end of the face 14.

In the illustrated embodiment, the mining operation is "retreating" such that the shearer 10 progresses through the seam 18 in a direction oriented toward a mine exit. In other embodiments, the operation may be "advancing" such that the shearer 10 progresses through the seam 18 in a direction oriented away from the mine exit.

Figure 3:
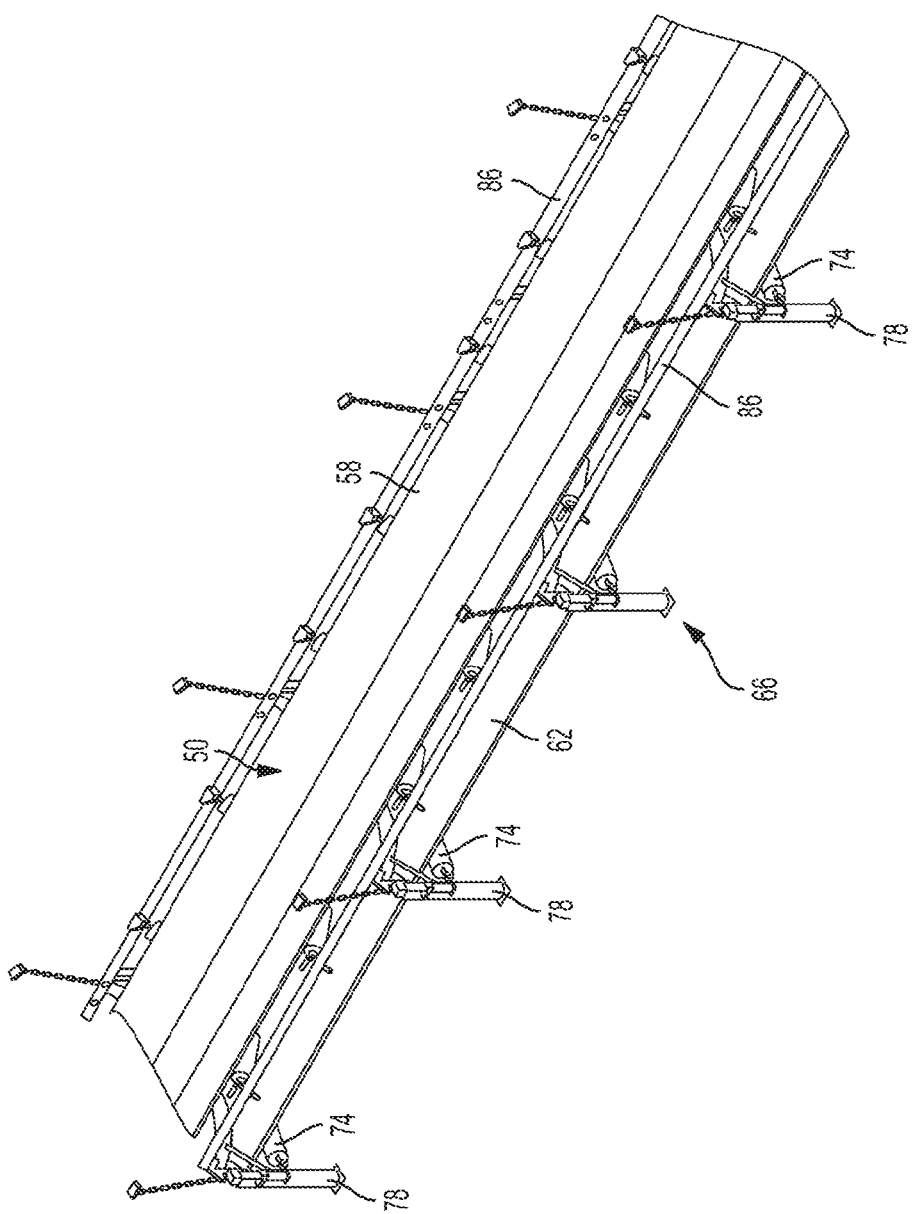
FIG. 3 is a perspective view of a portion of a conveyor support structure.

From the boot stage loader 38, the material may be transferred to a main conveyor 54. As shown in FIG. 3, the main conveyor 54 includes a conveyor belt 50 and a support structure 66. In the illustrated embodiment, the conveyor belt 50 includes a first or upper run 58 and a second or lower run 62, and the upper run 58 carries cut material (not shown). Also, in the illustrated embodiment, the support structure 66 includes multiple sections. Each section of the support structure 66 includes a stand or frame 70 and idler rollers 74. The belt 50 moves over an outer surface of the idler rollers 74.

Figure 4A:
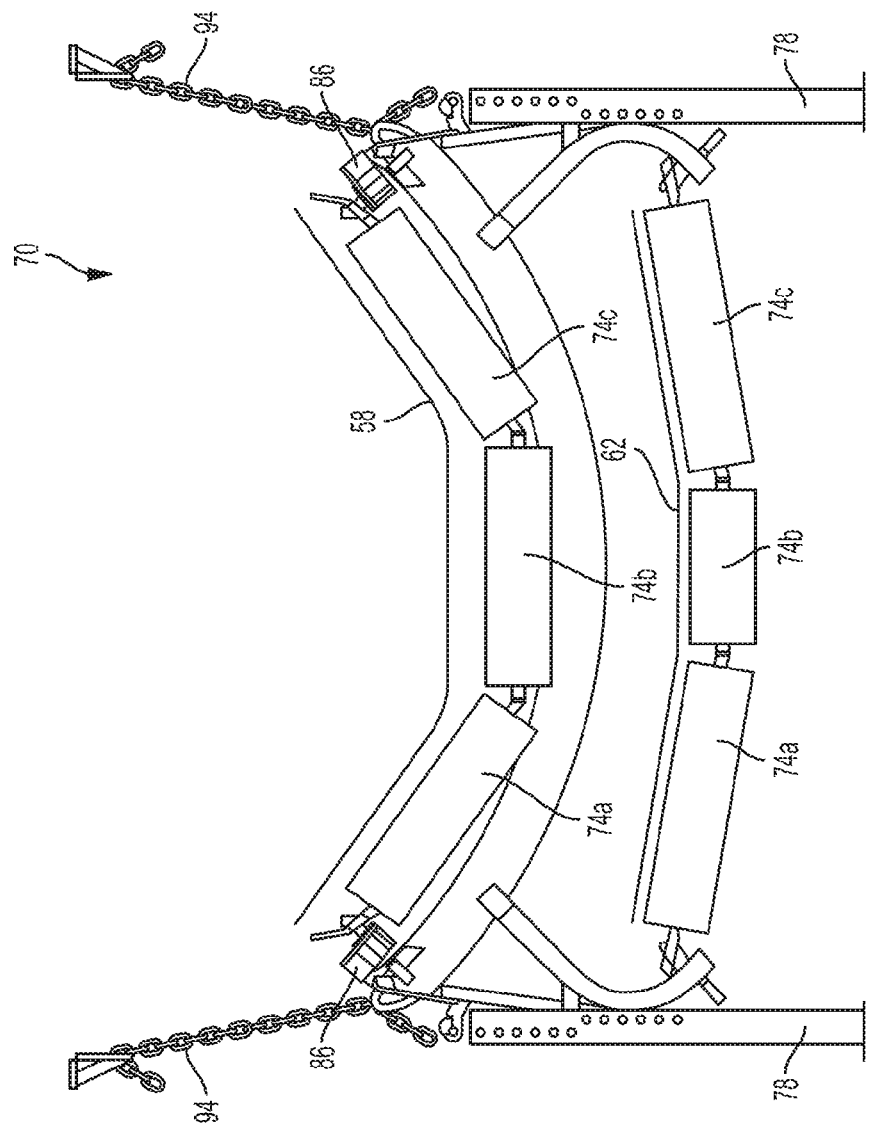
FIG. 4A is an elevation view of a frame of the conveyor support structure.

As shown in FIG. 4A, each frame 70 includes a pair of legs 78, and the rollers 74 extend laterally between the pair of legs 78 to support the conveyor belt 50. In the illustrated embodiment, three rollers 74 are positioned end to end, with a center roller 74b positioned between the end rollers 74a, 74c. The end rollers 74a, 74c are angled downwardly toward the center roller 74b, such that the rollers 74 form a U-shape. In the illustrated embodiment, each frame 70 includes three upper rollers 74 positioned at an upper level to support the upper run 58 of the belt 50, and three additional lower rollers 74 may be positioned at a lower level to support a lower run 62 of the belt 50.

In the illustrated embodiment, the conveyor support structure 66 also includes rails 86 extending between the legs 78 of adjacent frames 70, and the idler rollers 74 may be supported by the rails 86. In some embodiments, the rails 86 are stringer rails supported from above, e.g., by a chain 94 suspended from a mine roof (not shown).

Figure 4B:
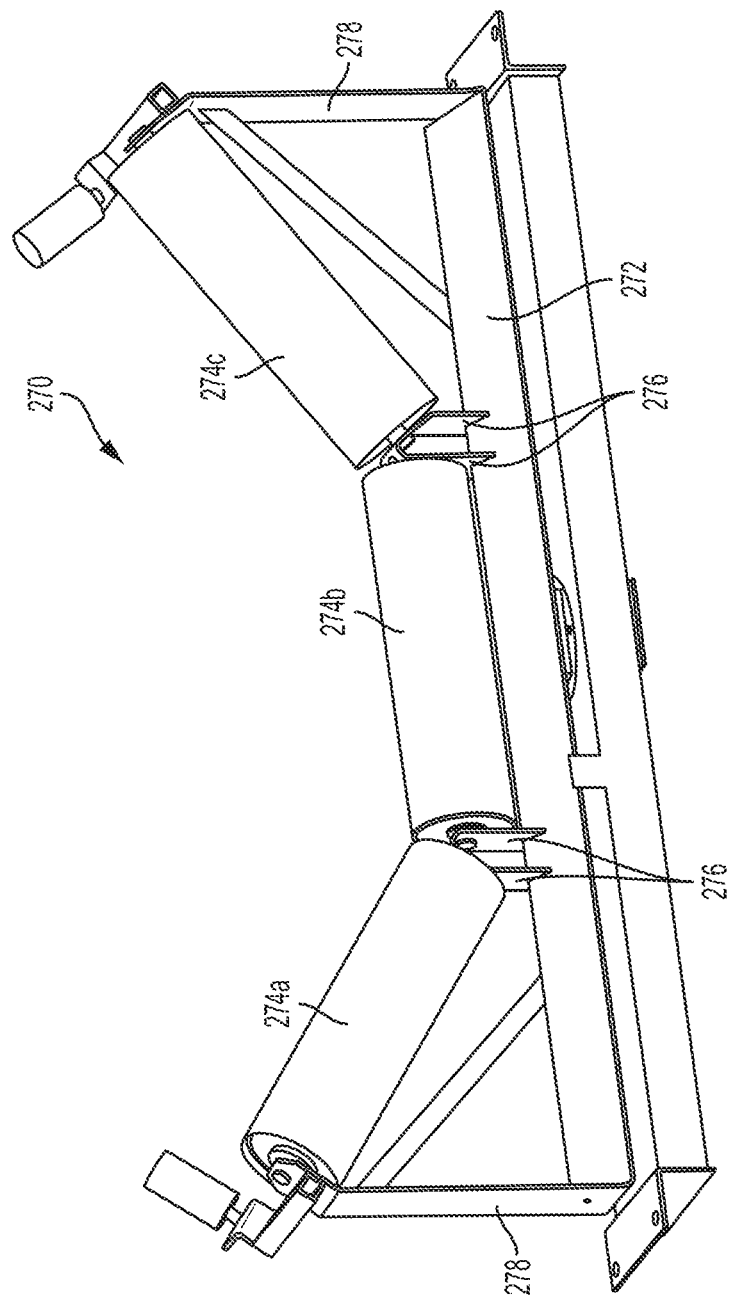
FIG. 4B is a perspective view of a frame according to another embodiment.
Figure 5:
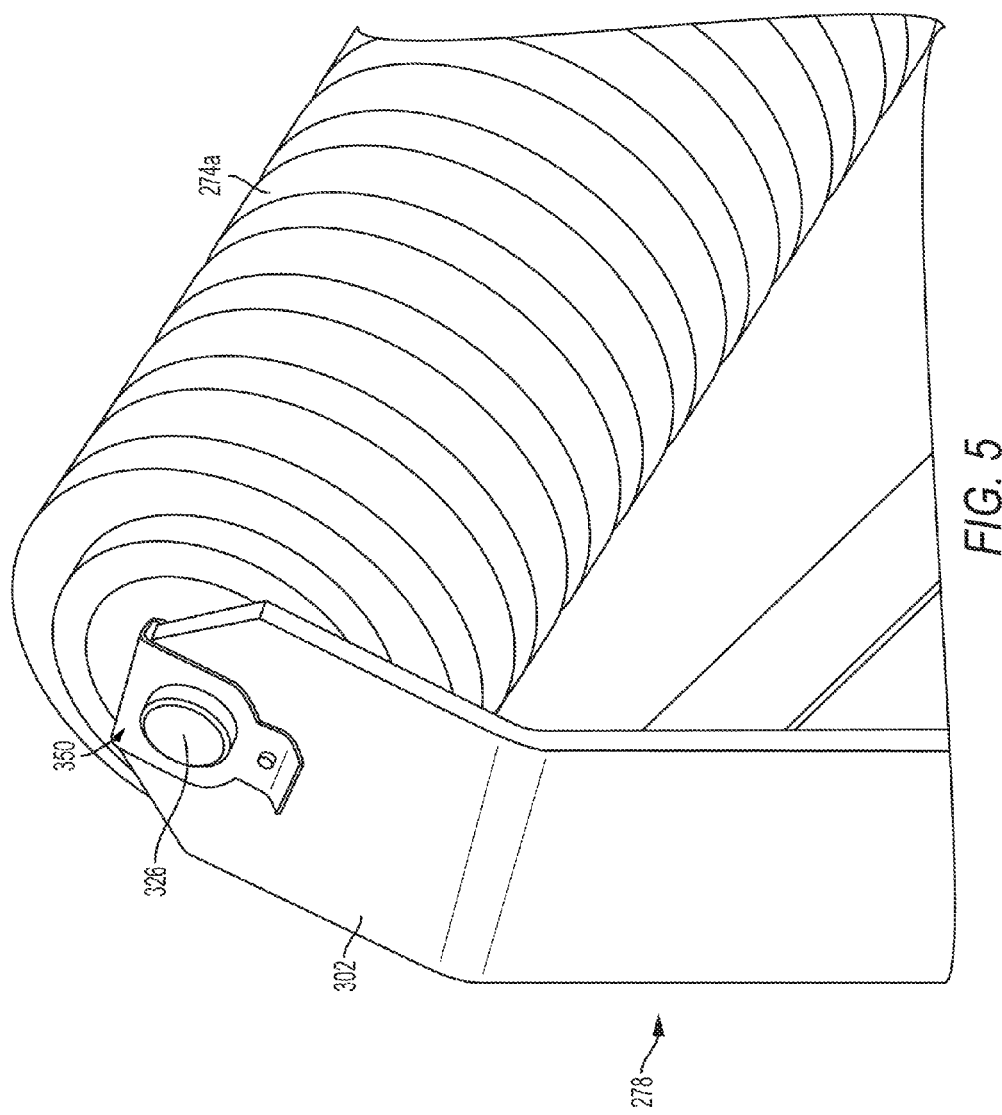
FIG. 5 is a perspective view of a roller, a support frame, and a retaining mechanism.
Figure 6:
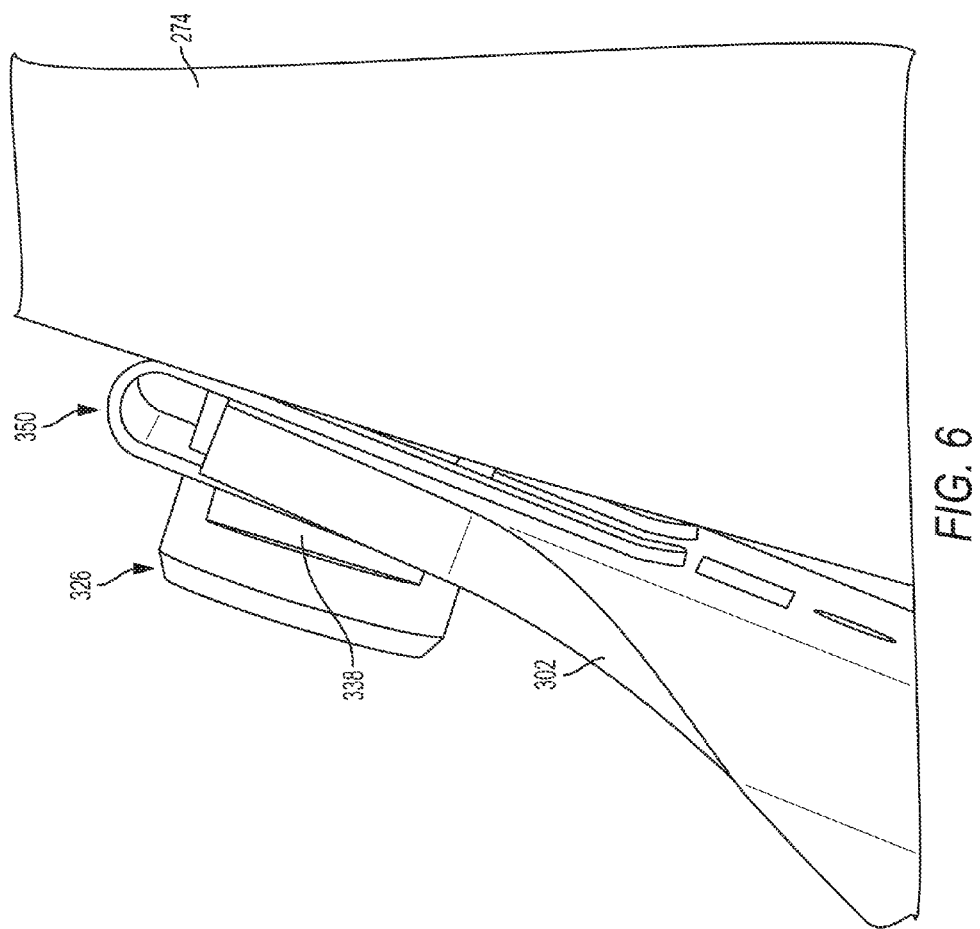
FIG. 6 is an enlarged side view of the roller, the support frame, and the retaining mechanism of FIG. 5.

FIG. 4B illustrates a frame 270 according to another embodiment. In the illustrated embodiment, the frame 270 includes a base 272, a pair of legs 278 extending upwardly from the base 272, and intermediate brackets 276 positioned between the legs 278. The legs 278 are positioned substantially parallel to one another, and the rollers 274 are positioned between the legs 278. One end of each end roller 274a, 274c is coupled to one of the legs 278, while an opposite end is coupled to one of the intermediate brackets 276. A center roller 274b is coupled between two of the intermediate brackets 276. The frame 270 includes three rollers 274 and the end rollers 274a, 274c are angled downwardly toward the center roller 274b, such that the rollers 274 form a U-shape; in other embodiments, the frame may include fewer or more rollers 274, and/or the rollers 274 may be positioned in a different configuration. Also, although one set of rollers 274 is illustrated in FIG. 4B, it is understood that the frame 270 may include additional rollers 274 to support additional portions of the belt 50 (FIG. 3).

Figure 7:
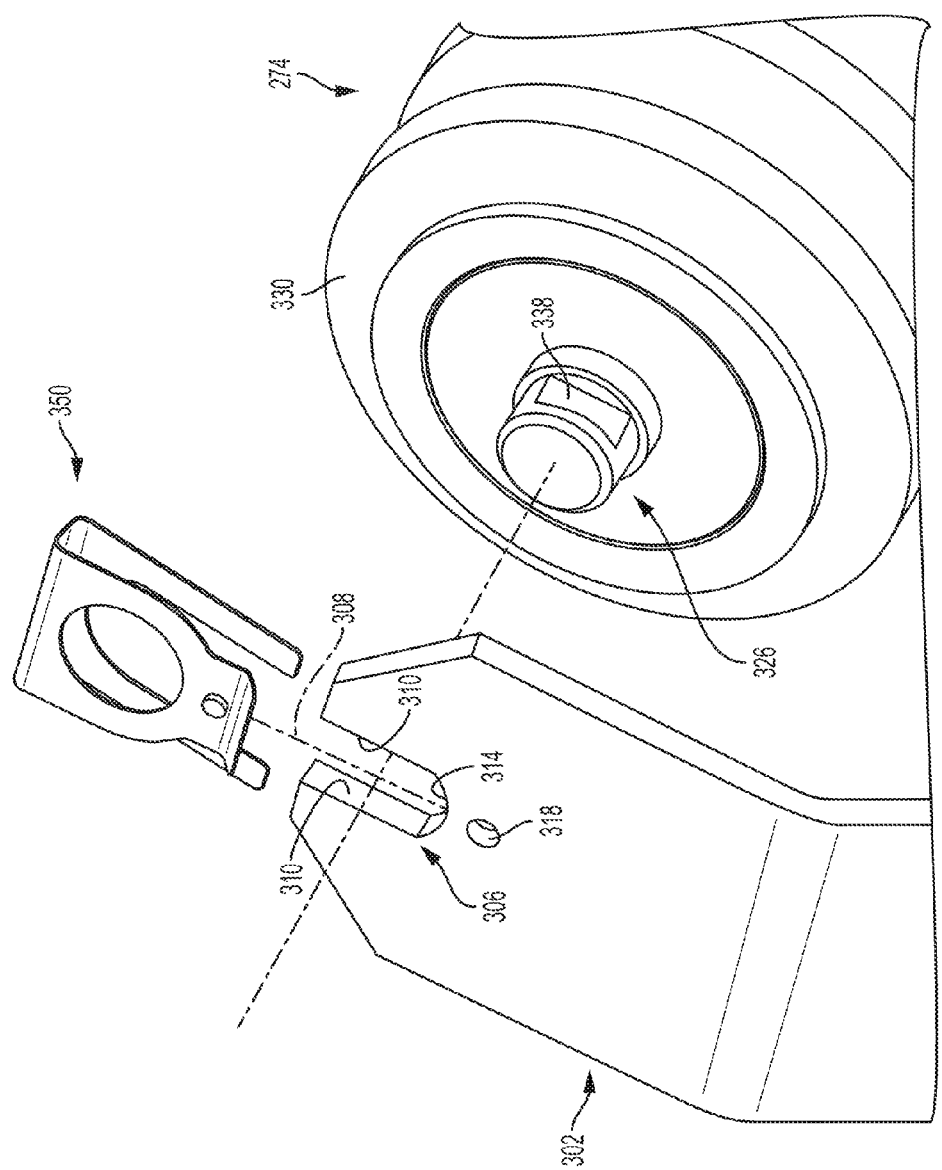
FIG. 7 is an exploded view of the roller, support frame, retaining mechanism of FIG. 5.
Figure 8:
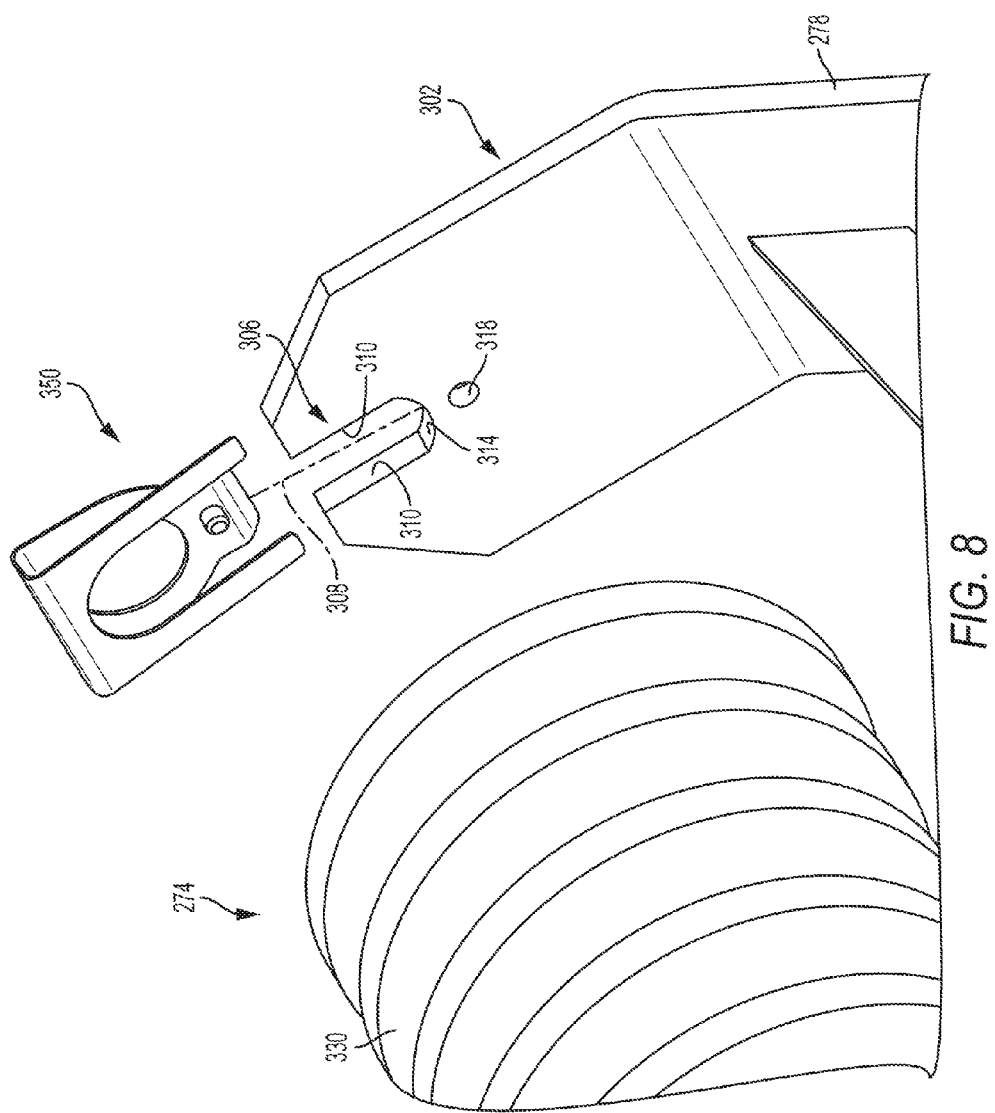
FIG. 8 is another exploded view of the roller, support frame, retaining mechanism of FIG. 5.

Referring to FIGS. 5-8, each leg 278 (or, with respect to the frame 70 of FIG. 4A, the leg 78 or the rail 86) supports an end of one of the rollers 274a. As best shown in FIGS. 7 and 8, in the illustrated embodiment, an end of the leg 278 forms a bracket 302 including a slot 306 and a hole 318 positioned adjacent the slot 306. The slot 306 extends along a longitudinal slot axis 308. The slot 306 includes a pair of planar side surfaces 310 and an arcuate surface 314 extending between the side surfaces 310. The slot 306 forms an opening adjacent an edge or end surface of the bracket 302, and the hole 318 is positioned adjacent the arcuate surface 314 of the slot 306.

Each roller 274 includes a shaft 326 and a shell 330 supported for rotation relative to the shaft 326. The shaft 326 includes an end 330 and a pair of planar surfaces 338 (FIG. 7) oriented parallel to one another. The planar surfaces 338 are received within the slot 306. In the illustrated embodiment, the shaft 326 is received through the open end of the slot 306 such that each planar surface 338 is adjacent one of the side surfaces 310 of the slot 306. The contact between the planar surfaces 338 of the shaft 326 and the side surfaces 310 of the slot 106 prevent the shaft 326 from rotating relative to the bracket 302.

The shaft 326 is secured against movement relative to the bracket 302 by a retaining mechanism or clip 350 preventing the shaft 326 from moving out of the slot 306. In the illustrated embodiment FIGS. 7 and 8, the clip 350 has a generally U-shaped profile such that the clip 350 extends around an end of the bracket 302 and engages the shaft 326.

Figure 9:
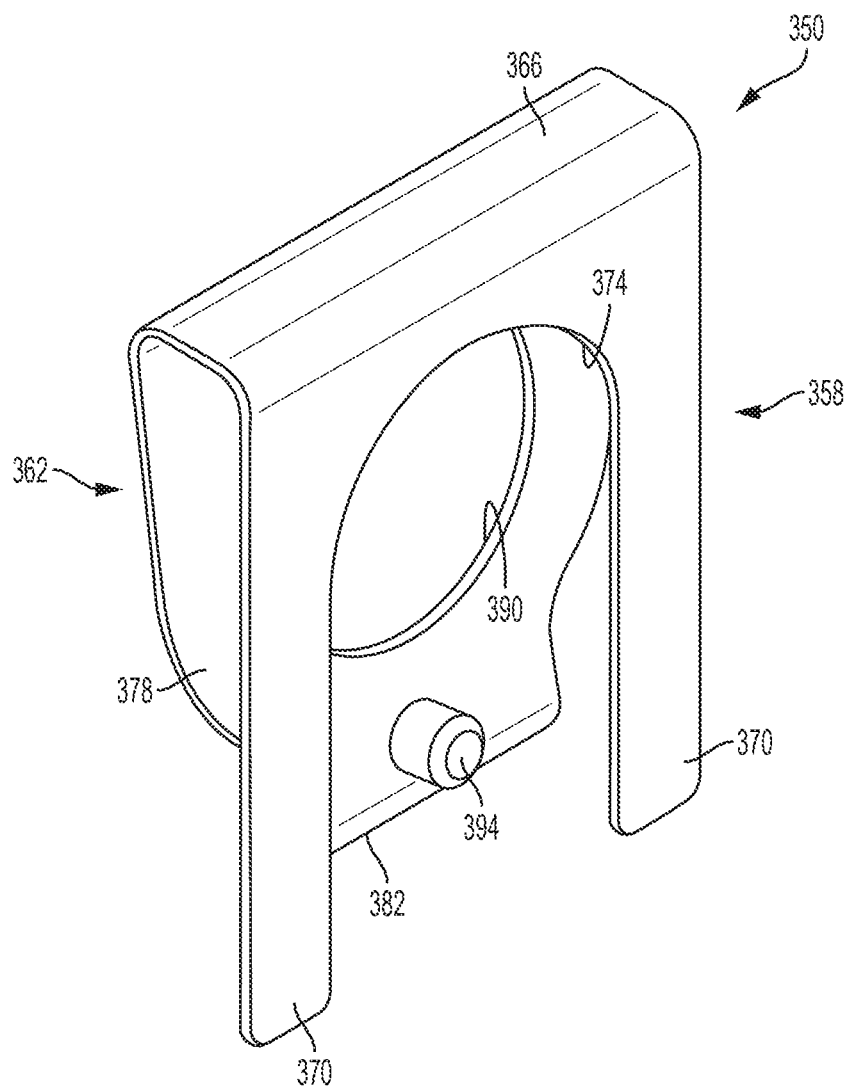
FIG. 9 is a perspective view of the retaining mechanism of FIG. 5.
Figure 10:
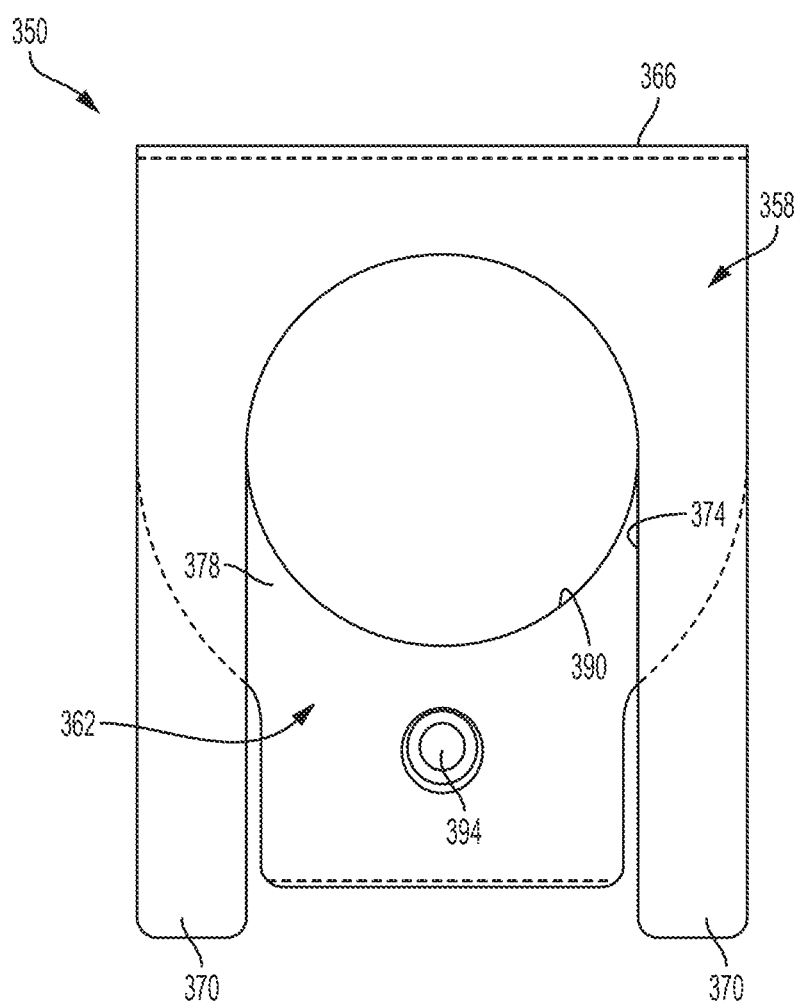
FIG. 10 is an elevation view of the retaining mechanism of FIG. 9.
Figure 11:
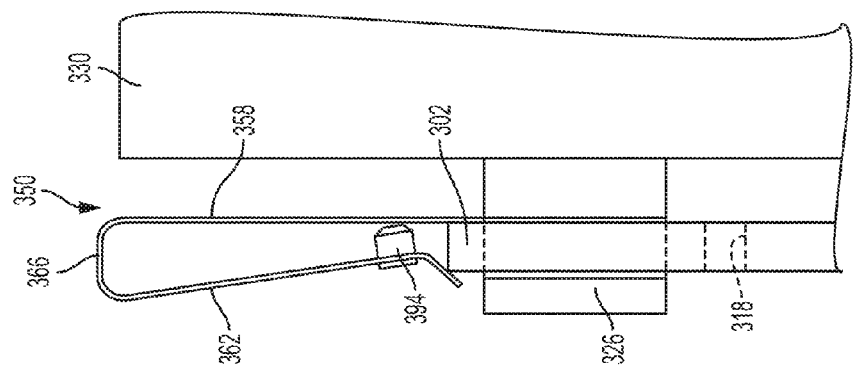
FIG. 11 is a side view of an assembly process with the retaining mechanism in a first position.

As shown in FIGS. 9 and 10, the clip 350 includes a first portion 358 and a second portion 362. The first portion 358 and the second portion 362 are connected to one another by a bend or bridge portion 366, and an inner side of the first portion 358 faces toward an inner side of the second portion 362. The second portion 362 may be angled toward the first portion 358, and, as shown in FIG. 11, a space between the first portion 358 and the second portion 362 decreases along a direction oriented away from the bridge portion 366 and toward a terminal end of the second portion 362. In the illustrated embodiment, the clip 350 is formed from spring steel and is flexible or resilient such that the bridge portion 366 exerts a biasing force on the second portion 362. That is, the second portion 362 is biased toward the first portion 358, although it is capable of being deflected or bent away from the first portion 358. In the illustrated embodiment, the second portion 362 is capable of bending through an angle of at least approximately 15 degrees. In other embodiments, the clip 350 may be formed from a different material and/or may be capable of bending through a different angle.

In the illustrated embodiment, the first portion 358 is substantially planar. The first portion 358 includes a pair of legs 370, and an open gap 374 is positioned between the legs 370. The second portion 362 of the clip 350 includes a flat section 378 and a tab 382 (FIG. 7) adjacent an end of the second portion 362. The tab 382 is formed at an angle relative to the flat section 378, and the tab 382 extends away from the first portion 358. The second portion 362 also includes an opening 390 and a protrusion 394. The protrusion 394 extends from the second portion 362 toward the first portion 358. In the illustrated embodiment, an end of the protrusion 394 is positioned between the legs 370 when the second portion 362 is in an undeflected position.

Figure 13:
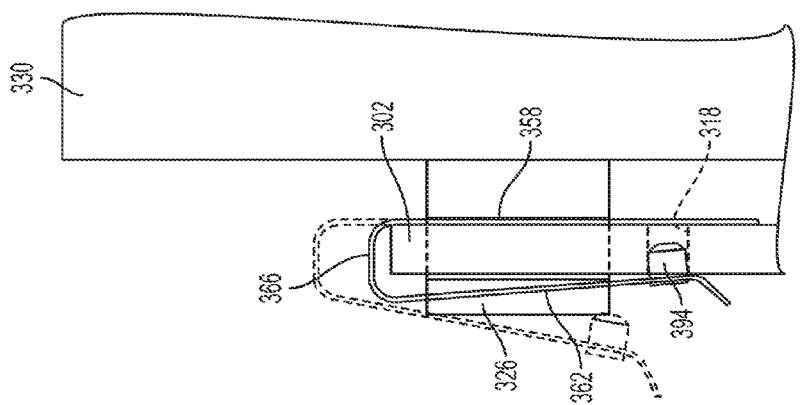
FIG. 13 is a side view of an assembly process with the retaining mechanism in a third position.
Figure 12:
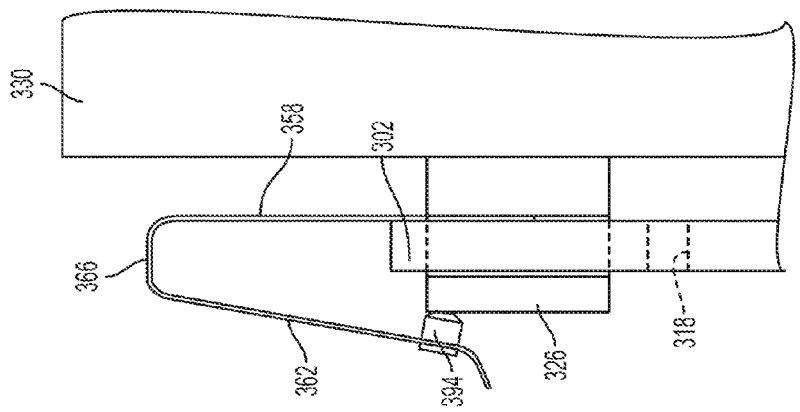
FIG. 12 is a side view of an assembly process with the retaining mechanism in a second position.

FIGS. 11-13 illustrate the coupling of the clip 350 to the bracket 302. After the shaft 326 of the roller 274 is positioned in the slot 306 of the bracket 302, the clip 350 is inserted onto the end of the bracket 302. The second portion 362 is deflected or bent away from the first portion 358, and the clip 350 slides relative to the bracket 302 such that the bracket 302 is positioned between the first portion 358 and the second portion 362 of the clip 350. The clip legs 370 are positioned on either side of the shaft 326, and the end of the bracket 302 is positioned adjacent the bridge portion 366. After the clip 350 is properly positioned relative to the bracket 302, the second portion 362 is released and the biasing force moves it toward the first portion 358. The clip 350 exerts a compressive force on the bracket 302. In the illustrated embodiment, the protrusion 394 is positioned within the hole 318 on the bracket 302. The biasing force maintains the protrusion 394 in the hole 318, thereby securing the clip 350 relative to the bracket 302. In other embodiments, one or more protrusions may be positioned on the bracket and may engage one or more holes positioned on the clip. The protrusions and holes may be positioned in a different location relative to the slot 306.

Unlike conventional coupling mechanisms that include one or more fasteners and require specific tools for assembling and disassembling the roller 274, the clip 350 is easily accessible and facilitates quick assembly and disassembly of the idler rollers 274 onto the frame 270. In addition, the clip 350 avoids the need to machine threaded holes on the brackets 302, thereby alleviating issues relating to tight tolerances. As a result, the conveyor support structure 66 requires fewer parts, simplifying manufacturing and assembly and reducing cost. In addition, unlike the threaded fasteners that are susceptible to corrosion and seizing in the harsh mine environment, the clip 350 is less likely to corrode and any corrosion will not impact its functionality.

Figure 14:
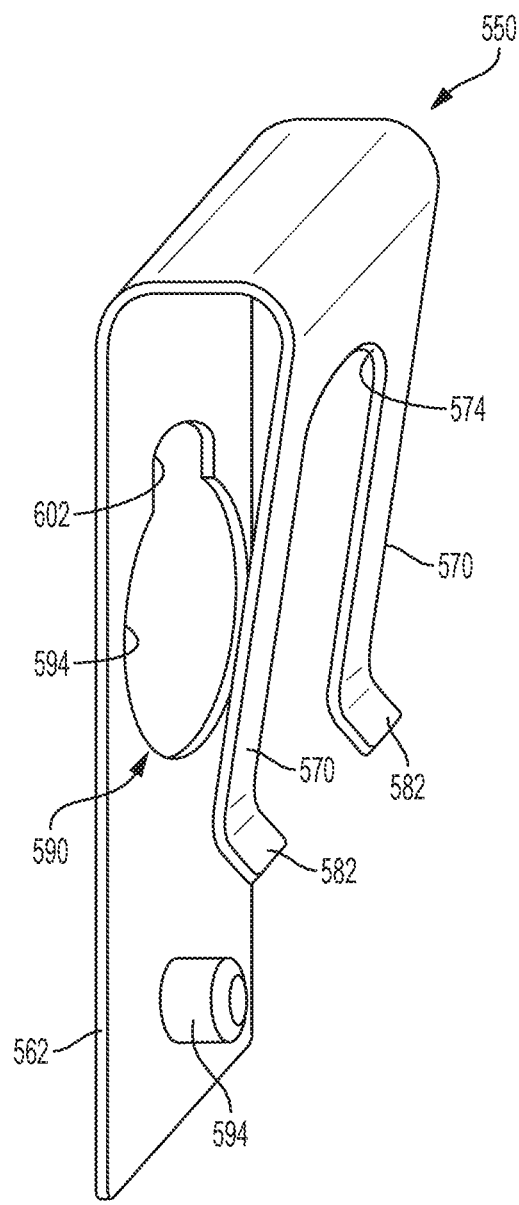
FIG. 14 is a perspective view of a retaining mechanism according to another embodiment.

FIGS. 14 and 15 illustrate a clip 550 according to another embodiment. The clip 550 is similar to the clip 350 described above with respect to FIGS. 5-13, and similar features are identified with similar reference numbers, plus 200. The clip 550 includes a second portion 562 having an opening 590 formed as a keyhole. During assembly, the end of the shaft 126 is first inserted through a round portion 598 of the opening 590, and then the clip 550 slides such that the planar surfaces 338 of the shaft 326 are positioned in a keyhole slot 602 that is formed continuously with the round portion 598. In addition, the second portion 562 has a planar shape, and each leg 570 includes a tab 582.

Although aspects of the conveyor system have been described above in the context of an underground mining operation, it is understood that the disclosure is not limited to this context. The aspects described above may be applied to trough belt conveyors and other types of conveyors, and/or may be applied to conveyors in underground mining, surface mining, hard rock mining, industrial, manufacturing, agriculture, and other contexts.

Although aspects have been described in detail with reference to certain preferred embodiments, variations and modifications exist within the scope and spirit of one or more independent aspects as described.

I claim:

1. A conveyor support comprising:
   a frame including a support arm;
   a roller including a shaft and a shell supported for rotation relative to the shaft, the shaft including an end; and
   a retainer for releasably securing the end of the shaft relative to the support arm, the retainer including a first portion engaging a first side of the support arm and a second portion engaging a second side of the support arm, the second portion biased toward the first portion to exert a compressive force on the support arm, at least one of the first portion and the second portion engaging the shaft of the roller, an opening extending through the first portion and the second portion to receive the shaft, a portion of the shaft extending through the opening.

2. The conveyor support of claim 1, wherein the support arm includes an end surface and a slot, the slot forming an opening in the end surface, wherein a portion of the shaft is positioned in the slot.

3. The conveyor support of claim 2, wherein the retainer is positioned around at least a portion of the slot and extends at least partially across the opening.

4. The conveyor support of claim 1, wherein the support arm includes a slot having a pair of planar sides, wherein a portion of the shaft includes a pair of planar surfaces formed on opposite side of the shaft, the shaft positioned in the slot such that each of the planar surfaces abuts one of the planar sides to prevent rotation of the shaft relative to the support arm.

5. The conveyor support of claim 1, wherein at least one of the first portion of the retainer and the second portion of the retainer includes a pair of parallel legs spaced apart, wherein a portion of the shaft includes a pair of planar surfaces formed on opposite side of the shaft, the planar surfaces positioned between the legs such that each of the planar surfaces abuts one of the legs.

6. The conveyor support of claim 1, further comprising a protrusion formed on one of the retainer and the support arm and a recess formed on the other of the retainer and the support arm, the protrusion engaging the recess to secure the retainer relative to the support arm.

7. The conveyor support of claim 1, wherein the support arm includes an elongated slot formed in an end surface of the support arm, a slot axis extending along the slot in a direction substantially perpendicular to the end surface, wherein the retainer is slidable relative to the support arm in a direction parallel to the slot axis between an unsecured position and a secured position.

8. The conveyor support of claim 1, wherein the retainer further includes an intermediate portion connecting the first portion and the second portion, the first portion including a planar portion and a tab forming an acute angle relative to the plane of the planar portion, the tab extending away from the first portion.

9. The conveyor support of claim 1, wherein the opening in the first portion of the retainer includes a round portion and a keyhole slot portion, wherein the shaft includes a pair of planar surfaces formed on opposite side of the shaft, a portion of the shaft positioned in the opening and the planar surfaces engage the keyhole slot portion.

10. A retainer for releasably securing a conveyor roller to a support frame, the retainer comprising:
    a first portion including a pair of parallel legs oriented in a first plane, the legs separated by a gap;
    a second portion including a planar portion extending in a second plane offset from the first plane, the second portion including one of a protrusion and a recess configured to engage the other of a protrusion and a recess formed on the support frame, the second portion biased toward the first portion, at least one of the first portion and the second portion configured to engage a shaft of the roller; and
    an intermediate portion extending between the first portion and the second portion.

11. The retainer of claim 10, wherein the pair of parallel legs extend away from the intermediate portion and the gap forms an arcuate opening configured to receive a portion of a shaft of the roller.

12. The retainer of claim 10, wherein the first portion further includes a tab forming an acute angle relative to the second plane, the tab extending away from the first portion.

13. The retainer of claim 10, wherein the first portion further includes an opening configured to receive a shaft of the roller.

14. The retainer of claim 13, wherein the opening includes a round portion and a keyhole slot portion.

15. The retainer of claim 10, wherein each of the parallel legs includes a distal end with respect to the intermediate portion, the distal end forming an acute angle relative to the first plane and extending away from the second portion.

16. The retainer of claim 10, wherein the second portion is capable of pivotable about the intermediate portion between a closed position and an open position, the second portion positioned adjacent the first portion in the closed position, the second portion spaced apart from the first portion in the open position.

17. A method for releasably securing a roller to a conveyor support frame, the method comprising:
   positioning a shaft of the roller within a slot of the support frame;
   aligning a retainer adjacent an end surface of the support frame; and
   sliding the retainer relative to the support frame until a portion of the retainer extends around a portion of the shaft and is secured against movement relative to the support frame.

18. The method of claim 17, wherein positioning the shaft includes inserting the shaft into the slot from the end surface of the support frame along a longitudinal axis of the slot, and wherein sliding the retainer relative to the support frame includes sliding the retainer in a direction parallel to the longitudinal axis of the slot.

19. The method of claim 17, wherein sliding the retainer relative to the support frame includes sliding a first portion of the retainer along a first surface of the support frame and a second portion of the retainer along a second surface of the support frame opposite the first surface, the second surface biased toward the first portion to exert a compressive force on the support frame.

20. The method of claim 17, wherein sliding the retainer includes positioning a protrusion positioned on one of the retainer and the support frame in a recess positioned on the other of the retainer and the support frame to secure the retainer against movement relative to the support frame.

* * * * *